United States Patent [19]
Kamiya et al.

[11] Patent Number: 4,958,185
[45] Date of Patent: * Sep. 18, 1990

[54] PHOTOGRAPHING APPARATUS

[75] Inventors: Osamu Kamiya, Machida; Yasutomo Fujiyama, Kawasaki, both of Japan

[73] Assignee: Canon Kabushiki Kaisha, Tokyo, Japan

[*] Notice: The portion of the term of this patent subsequent to Apr. 19, 2005 has been disclaimed.

[21] Appl. No.: 206,987

[22] Filed: Jun. 7, 1988

Related U.S. Application Data

[63] Continuation of Ser. No. 16,994, Feb. 19, 1987, which is a continuation of Ser. No. 851,270, Apr. 10, 1986, which is a continuation of Ser. No. 635,517, Jul. 30, 1984.

[30] Foreign Application Priority Data

Aug. 3, 1983 [JP] Japan ................... 58-142206

[51] Int. Cl.$^5$ ........................... G03B 7/099
[52] U.S. Cl. .................... 354/478; 354/429
[58] Field of Search .......... 354/476, 477, 478, 429, 354/431

[56] References Cited

U.S. PATENT DOCUMENTS

| | | | |
|---|---|---|---|
| 3,060,823 | 10/1962 | Nelson | 354/478 |
| 3,163,097 | 12/1964 | Zenyoji et al. | 354/477 |
| 3,823,411 | 7/1974 | Hasegawa et al. | 354/429 |
| 3,864,035 | 2/1975 | Kuehnle | 354/3 |
| 4,064,516 | 12/1977 | McLaughlin et al. | 354/478 |
| 4,486,096 | 12/1984 | Endo et al. | 354/476 |
| 4,682,873 | 7/1987 | Ohmura et al. | 354/478 |

FOREIGN PATENT DOCUMENTS 0810459 7/1974 Belgium ............... 354/476

*Primary Examiner*—Russell E. Adams
*Attorney, Agent, or Firm*—Fitzpatrick, Cella, Harper & Scinto

[57] ABSTRACT

In a photographing apparatus such as a single lens reflex camera, metering photoelectric conversion elements are provided in the optical path of an imaging optical system or a finder optical system and the line width of the pattern forming the elements is set to a width undiscernable by the human eye. Thus, with such metering photoelectric conversion elements, no irregularity of the quantity of amount is caused in the image observed through the finder or the image photographed.

7 Claims, 3 Drawing Sheets

PHOTOGRAPHING APPARATUS

This application is a continuation of application Ser. No. 016,994 filed Feb. 19, 1987, which was a continuation of Ser. No. 851,270, filed Apr. 10, 1986, which was a continuation of Ser. No. 635,517, filed July 30, 1984, now abandoned.

BACKGROUND OF THE INVENTION

1. Field of the Invention

This invention relates to a photographing apparatus provided with a metering system.

2. Description of the Prior Art

Cameras, cinecameras, video cameras, etc., are known as photographing apparatuses. These photographing apparatuses are provided with a metering system therein for detecting the brightness information of an object to be photographed. FIG. 1 of the accompanying drawings is a view for illustrating the metering system of a conventional single lens reflex type camera. The light beam from the object 1 to be photographed passes through a photo-taking lens system 2, and then is directed to a finder optical system by a reflecting mirror 7 and passes through a focusing screen 6 and a condenser lens 4 in succession, whereafter it is inwardly reflected by a penta prism 3 and directed to the observer 9. In that case, part of the light beam is divided by a half-prism 4a provided in the finder optical path of the condenser lens 4 and is directed to a metering element 5 such as silicon or CdS provided outside the finder optical path. The brightness of the object to be photographed is measured by the output from the metering element 5 and the amount of exposure is determined.

As another example of the conventional measuring system, as shown in FIG. 2 of the accompanying drawings, a part of the reflecting surface of a reflecting mirror 7 is formed by a half-mirror and a metering element 8 is secured to the back of the reflecting mirror 7 at a position for receiving the light beam passed through the half-mirror, whereby the brightness of the object to be photographed is measured.

However, in the metering system shown in FIG. 1, when the object to be photographed is to be observed through the half-prism 4a is directed away from the optical path to the finder and therefore, a dark portion is created in the central portion of the finder. This provides a very great hindrance when the object to be photographed is monitored. Further, the light beam divided by the half-mirror is determined by the shape of the half-mirror. Therefore, the metering system is restricted to one whereby the central portion of the finder picture plane is emphatically metered and to the system whereby the entire picture plane is averagely metered, or the condensor lens must be interchanged if an attempt is made to adopt the respective systems.

Also, in the metering system shown in FIG. 2, a plurality of metering elements are disposed on the back of the reflecting mirror 7, whereby they are suitably selected and it is possible to electrically choose the center priority metering or the average metering. In this system, however, to sufficiently secure the brighness of the image seen from the finder, the half-mirror of the reflecting mirror must be made into a structure of high reflection factor and accordingly, the light passed through the half-mirror and entering the metering element 8 becomes weaker and the metering in a dark environment becomes inaccurate. A further disadvantage of this system is that when the shutter button is depressed and photographing is effected on the film, this reflecting mirror is designed to jump upwardly and therefore the connection for supplying the electrical signal from the metering element to the camera body side is difficult and is lacking reliability.

SUMMARY OF THE INVENTION

It is an object of the present invention to provide a photographing apparatus having a metering system in which no irregularity of the quantity of light is created in the image observed through the finder and in the image photographed.

It is a further object of the present invention to provide a photographing apparatus having a metering system in which change-over of various metering methods can be easily effected.

It is still a further object of the present invention to provide a photographing apparatus having a metering system which is easy to manufacture and simple in structure as well as excellent in reliability and which can be produced inexpensively.

In the photographing apparatus according to the present invention, a metering element is directly provided in an optical path of the light beam from an object to be photographed, to thereby achieve the above objects. As regards the size of this metering element, the line width thereof can be formed on the order of 1 micron and into a desired pattern by semiconductor printing methods and this pattern cannot be discerned by the resolving power of the observer's eye. Also, even if the light beam which passes through such a minute pattern is photographed on the film, deterioration of the image is small and accordingly, it is also possible to provide a metering element in the imaging optical system. Thus, the pattern of the metering element is directly provided in the optical path, the quantity of light consumed by the metering element may be small and therefore, the loss of the quantity of light can be reduced. Accordingly, for example, the photographer who is looking through the finder can only see the image of the object to be photographed and does not sense any irregularity in the quantity of light. Further, integrated circuit manufacturing techniques can be used and therefore, manufacturing of the apparatus is easy and mass production at a low cost is possible. Still further, lead wires can be made in a similar manner, and this leads to a simple structure and increased reliability.

In a photographing apparatus according to the present invention, it is desirable that the metering element be provided in the finder optical path. The finder optical path refers to the optical path for forming the finder view field. For example, in the single lens reflex camera shown in FIGS 1 and 2, the finder optical path refers to the reflecting mirror 7 and the subsequent optical path. Further, in this case, the optical path refers to the portion through which the light beam passes from the object to be photographed, which can be visually perceived as an image.

Further, in the present invention, the position at which the metering element is provided is not restricted, whereas it is desirable with the ease of manufacture taken into account that the metering element be provided on a flat surface. For example, if the metering element is to be provided in the finder optical system of the single lens reflex camera, the position at which the metering element is provided is the flat surface of the jump-up reflecting mirror 7, the focusing screen 6 or the condenser lens 4 or the flat surface of the penta prism 3.

Furthermore, in the present invention, the metering element may simply be a construction of a photoconductor or an optical electromotive force type element of multi-layer structure. The material forming the metering element may be amorphous silicon, CdS, Se, Se-Te, organic semiconductor, copper phthalocyanine, berylene pigment, $AlCl_3$ phthalocyanine or the like. The construction and operation of the present invention will hereinafter be described in detail, and the aforedescribed single lens reflex camera is cited as the photographing apparatus and the position at which the metering element is provided is exemplarily shown as one in the finder optical path, but as previously mentioned, the type of apparatus to which the present invention is applied and the position at which the metering element is provided are of course not restricted to these embodiments.

The invention will become more fully apparent from the following detailed description thereof taken in conjunction with the accompanying drawings.

DESCRIPTION OF THE PREFERRED EMBODIMENTS

Figure 1:
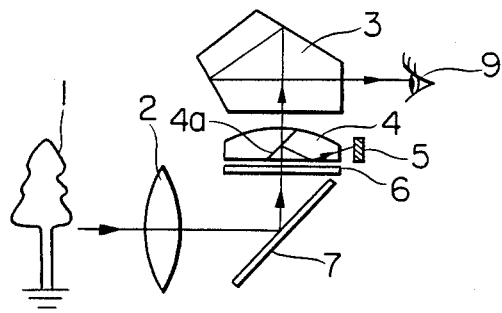
FIGS. 1 and 2 are views for illustrating the conventional metering system in a photographing apparatus.
Figure 2:
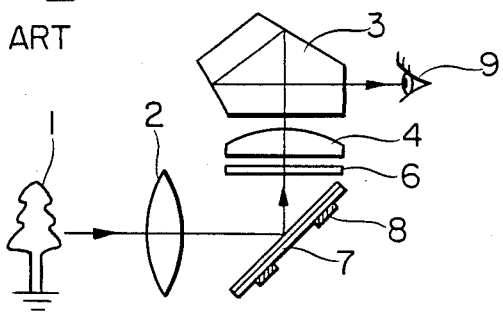
Figure 3:
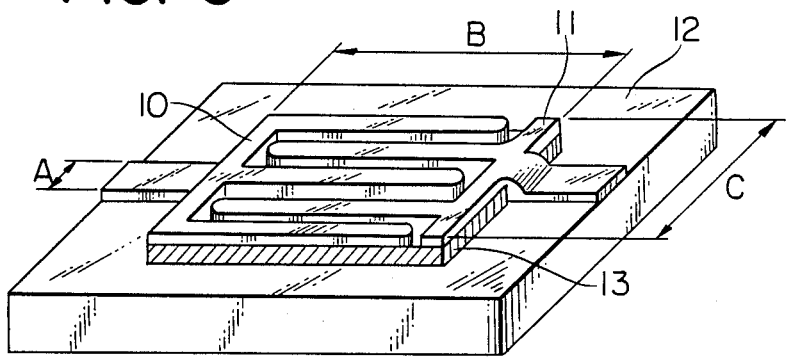
FIG. 3 shows an embodiment of the photoelectric conversion element portion as the metering element applied to the photographing apparatus of the present invention.

FIG. 3 shows an example of the photoelectric conversion element portion used in the metering system of a photographing apparatus according to the present invention. This photoelectric conversion element portion serves to measure the quantity of light at one spot on the picture plane. In FIG. 3, reference numeral 12 designates a substrate of synthetic resin or glass, reference numeral 13 denotes a film of photoconductor comprising amorphous silicon or CdS provided on the glass substrate, and reference numerals 10 and 11 designate comb-shaped electrodes formed of a photoconductive material such as Al or Cr and provided on the photoconductor film 13. When light enters the photoconductor film, the resistance of this film varies and a current flows between the electrodes 10 and 11, and by measuring the amount of this current, the quantity of light of the incident light beam is measured. The construction of the photoelectric conversion element shown in FIG. 3 is similar to the construction of the conventional element, and in the present embodiment, it is to be understood that the construction of this element is very minute. For example, it is desirable that the dimensions B, C of the photoelectric conversion element portion shown in FIG. 3 be $100\mu$ or less, and the electrode of the lead wire and the width A of the lead wire may sufficiently be of the order of $10\mu$.

Figure 4:
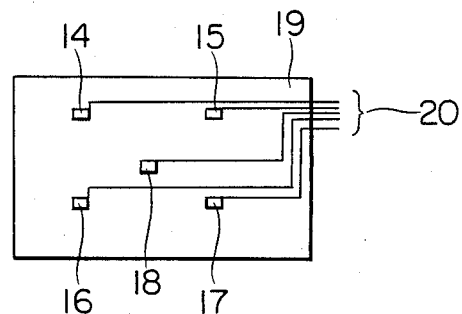
FIG. 4 shows an example of the arrangement of the photoelectric conversion element portion in the photographing apparatus of the present invention.

FIG. 4 shows the manner in which a plurality of photoelectric conversion element portions as shown in FIG. 3 are disposed on the surface of an optical element such as the reflecting mirror, the focusing screen, the condenser lens or the penta prism of a single lens reflex camera. In FIG. 4, reference numerals 14–18 designate the photoelectric conversion element portions, reference numeral 19 denotes an optical member, and reference numeral 20 designates a group of lead wires.

Since these photoelectric conversion elements and the width of the lead wires are formed to a size of several $\mu$ to several tens of $\mu$, they cannot be discerned by the naked eye and accordingly, they do not form any hindrance to image pick-up when the finder is looked into.

Further, the photoconductor of these photoelectric conversion elements is formed of a film of amorphous silicon or CdS and therefore, like the electrodes and lead wires, a number of photoelectric conversion elements can be formed on a substrate at a time by techniques such as deposition by evaporation and etching.

Therefore, by suitably selecting one of the numerous photoelectric conversion elements by a technique such as a change-over switch, it is possible to freely choose center priority metering or average metering.

When, for example, only the element 18 is operated, the center priority metering is provided and, when all elements 14–18 are operated, the average metering is provided.

The electrical signals from these photoelectric conversion elements are amplified by an integrated circuit. Although amorphous silicon and CdS have been shown as the photoconductor, any other material may be employed if it can be formed into a film.

Also, the photoconductor whose resistance value is variable by light has been shown in the above-described embodiment, but the elements of the photoelectric converting portion may be provided by photo-electromotive force elements. The construction of such photoelectromotive force elements may be similar to the construction of the conventional elements and therefore need not be described herein.

Figure 5:
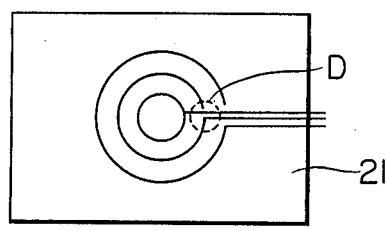
FIGS. 5 and 6 show another embodiment of the photoelectric conversion element portion applied to the photographing apparatus of the present invention.
Figure 7:
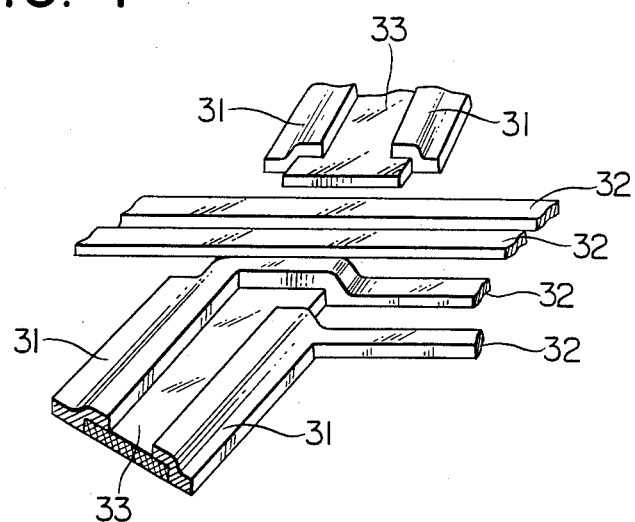
FIG. 7 is an enlarged view of the photoelectric converting portion shown in FIG. 5.

FIG. 5 shows another embodiment of the photoelectric conversion element portion in which the photoconductor of the photoelectric conversion element portion 21 is formed into an annular shape. FIG. 7 is an enlarged perspective view showing the portion indicated by D in FIG. 5. In FIG. 7, reference numeral 31 designates electrodes, reference numeral 32 denotes lead wires, reference numeral 33 designates a photoconductor. In this case, the width of the annulus may suitably be of the order of several tens of $\mu$.

Figure 6:
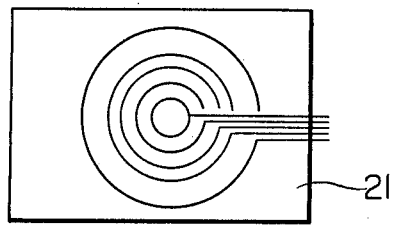

FIG. 6 shows an embodiment in which the diameter of the central annuluses of a group of annulic is narrowed and the specific gravity in the central portion is enhanced, that is, the photoconductor is disposed very densely in the central portion. By varying the intervals between the annuluses in this manner, metering can be effected with a desired specific gravity attached to each location in the picture plane.

The shape of the photoconductor of the photoelectric conversion element portion is not restricted to the above-described shape, but may be one of various shapes such as a cross shape or a square shape.

Figure 8:
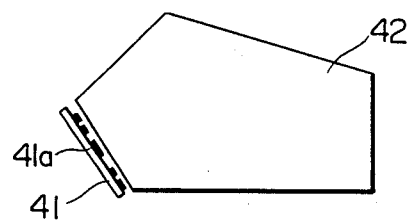
FIGS. 8 and 9 show examples of the manner in which the photoelectric converting portion used in the photographing apparatus of the present invention is provided.
Figure 9:
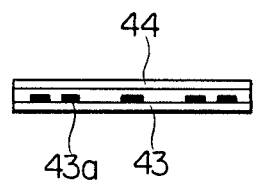

Also, in addition to directly providing the photoelectric conversion elements with the surface of the optical member of the above-described photographing apparatus as the substrate, the photoelectric converting portion may be held between and secured to two optical members by a suitable adhesive agent, as shown in FIGS. 8 and 9, whereby higher reliability can be obtained. For example, in FIG. 8, a photoelectric conversion element portion 41a is provided on a reflective planar substrate 41, and the substrate 41 is adhesively secured to the optical path portion of a penta prism 42. Also, in FIG. 9, a photoelectric conversion element portion 43a is provided on one of two transparent planar optical members 43 and 44, and these two optical members are adhesively secured to each other. These members thus adhesively secured to each other may be adhesively secured to the aforementioned finder optical member. One of the two optical members 43 and 44 may be the aforementioned focusing screen, the flat surface of the condenser lens or the light-transmitting surface of the penta prism.

In the present invention, as has hitherto been described, the amount of exposure can be measured substantially without hampering the image on the finder or on the film surface and further, by suitably selecting a plurality of photoelectric conversion elements during the metering, it is made possible to adjust the amount of exposure in accordance with the irregularity of the brightness of the object to be photographed.

A further effect of the present invention is that the photoelectric conversion elements of the present invention can be installed at free locations on the optical member of a camera.

Still a further effect of the present invention is that a number of photoconductor films, electrodes and wirings can be formed at the same time by deposition by evaporation and etching and therefore the photographing apparatus can be realized inexpensively.

What we claim is:

1. A photographing apparatus comprising:
    an optical system including at least one optical element for forming an image of an object to be photographed on a light-receiving medium;
    a plurality of metering photoelectric conversion elements each having a pattern thereon, said photoelectric conversion elements being provided on or in the vicinity of a focal surface of an optical element in said optical system in an optical path through which a light beam from the object is directed to the eye of a user of the photographing apparatus, and the size and shape of the pattern on each of said photoelectric conversion elements being selected so as to be indiscernible to the human eye; and
    means for selectively outputting information from said photoelectric conversion elements.

2. A photographing apparatus according to claim 1, wherein a plurality of said photoelectric conversion elements are provided and further comprising means for selectively outputting information from said photoelectric conversion elements.

3. A photographing apparatus comprising:
    an imaging optical system including at least one optical system for forming an image of an object to be photographed on a light-receiving medium;
    a finder optical system through which the image identical to the image of the object formed on the light-receiving medium can be viewed by a user of the photographing apparatus;
    a plurality of photoelectric conversion elements each having a pattern thereon, said photoelectric conversion elements being provided on or in the vicinity of a focal surface of an optical element in said imaging optical system in an optical path through which the light beam from the object is directed, via said imaging optical system and said finder optical system, to the eye of the user of the photographing apparatus, and the size and shape of the pattern on each of said photoelectric conversion elements being selected so as to be indiscernible to the human eye; and
    means for selectively outputting information from said photoelectric conversion elements.

4. A photographing apparatus according to claim 3, wherein said optical element is adapted to serve as a substrate wherein said photoelectric conversion elements are provided directly on said optical member.

5. A single lens reflex camera comprising:
    a lens system including at least one optical element for forming an image of an object to be photographed on a light-receiving surface;
    a finder optical system;
    an optical member for directing a light beam from said lens system to said finder optical system;
    a plurality of photoelectric conversion elements each having a pattern thereon, said photoelectric conversion elements being provided on or in the vicinity of a focal surface of an optical element in said lens system in an optical path through which the light beam from the object is directed, via said lens system, said optical member and said finder optical system, to the eye of a user of the camera, and the size and shape of said photoelectric conversion element being selected so as to be indiscernible to the human eye; and
    means for selectively outputting information from said photoelectric conversion elements.

6. A single lens reflex camera according to claim 5, wherein said optical element has a planar surface being adapted to serve as a substrate and wherein said photoelectric conversion elements are provided directly on the planar surface.

7. A photographing apparatus comprising:
    an optical system for forming an image of an object to be photographed on a light-receiving medium;
    at least one photoelectric conversion element each having a pattern thereon, said photoelectric conversion element being provided in an optical path through which a light beam from the object is directed to the eye of a user of the photographing apparatus, and the size and shape of said photoelectric conversion element being selected so as to be indiscernible to the human eye; and
    at least one lead wire portion connected to said photoelectric conversion element and provided in said optical path, the width of said lead wire portion selected to be thinner than that discernible to the human eye.

* * * * *

UNITED STATES PATENT AND TRADEMARK OFFICE
CERTIFICATE OF CORRECTION

PATENT NO. : 4,958,185
DATED : September 18, 1990
INVENTOR(S) : Kamiya

It is certified that error appears in the above-identified patent and that said Letters Patent is hereby corrected as shown below:

ON THE TITLE PAGE:

AT [56]:

"0810459 7/1974 Belgium ... 354/476" should read
--0810459 1/1974 Belgium ... 354/476--.

COLUMN 1:

Line 44, "observed" should read --observed through the finder, part of the light beam passed--.

Line 52, "one" should read --one system--.

COLUMN 4:

Line 56, "annuluses" should read --annulus--; and "annulic" should read --annuluses--.

Signed and Sealed this

Twenty-eighth Day of July, 1992

Attest:

DOUGLAS B. COMER

*Attesting Officer*    *Acting Commissioner of Patents and Trademarks*